Oct. 8, 1968  F. E. RYDER  3,404,596
WATERPROOF FASTENING DEVICE
Filed Aug. 24, 1966  2 Sheets-Sheet 1
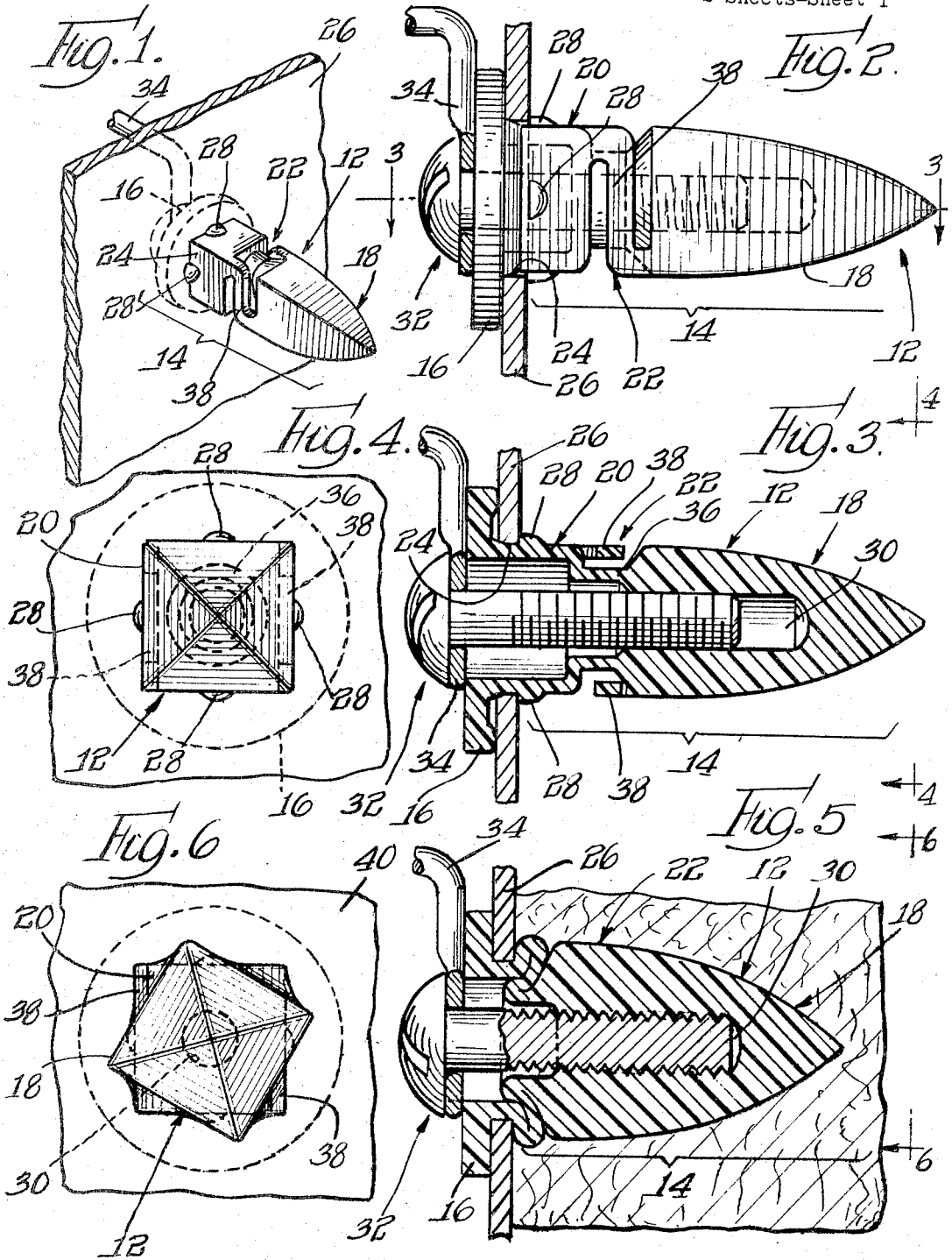
Inventor
Francis E. Ryder
By: Olson, Trexler, Wolters & Bushnell attys.

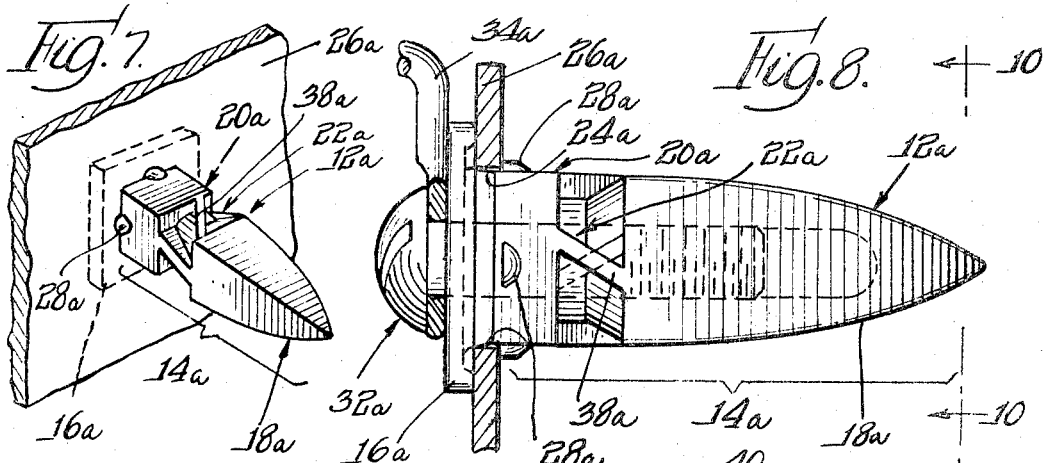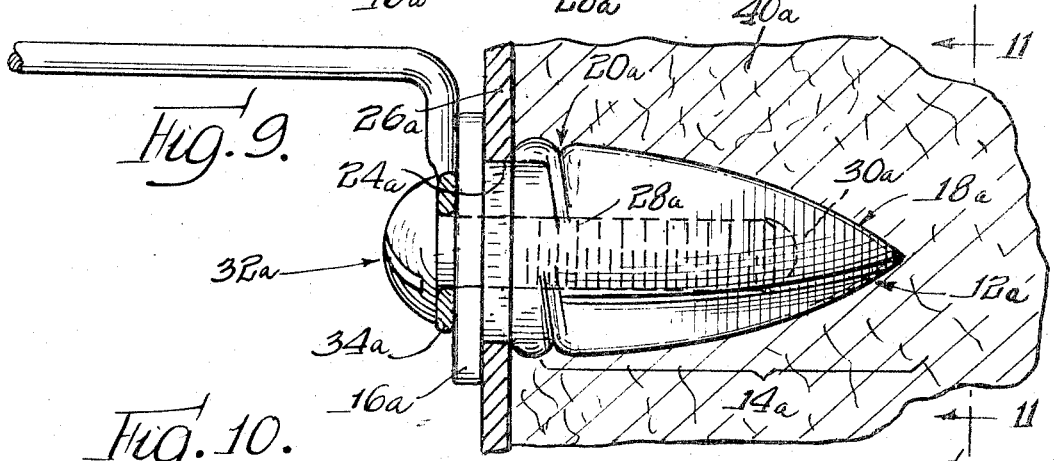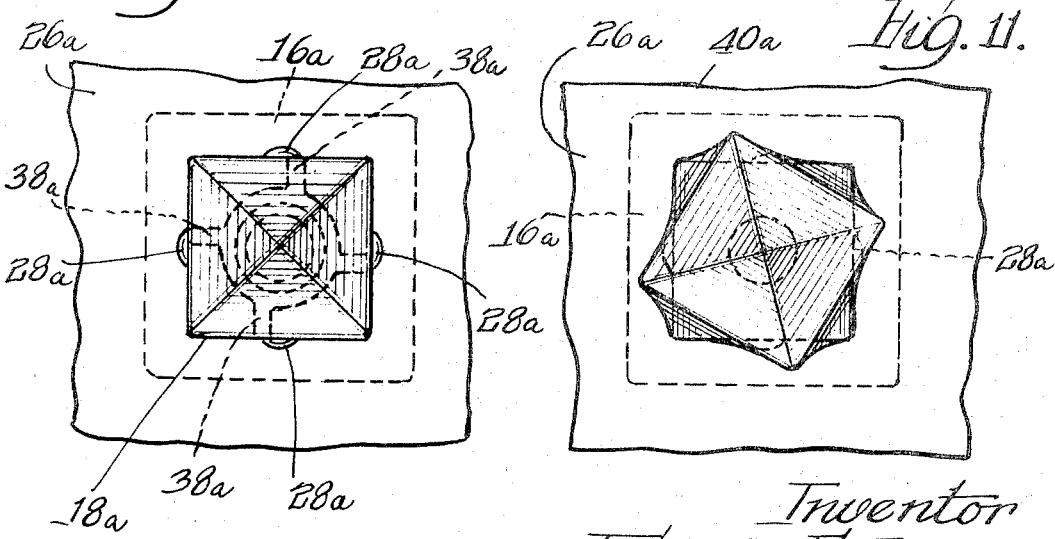

Patent text

3,404,596
WATERPROOF FASTENING DEVICE

Francis E. Ryder, Des Plaines, Ill., assignor to Illinois Tool Works Inc., Chicago, Ill., a corporation of Delaware
Filed Aug. 24, 1966, Ser. No. 574,661
8 Claims. (Cl. 85—70)

ABSTRACT OF THE DISCLOSURE

This invention relates generally to fastening devices and more particularly to fastening devices of the type having a shank adapted to be inserted within a complementary aperture in a workpiece and a head at one extremity of the shank adapted to be clamped against one side of the workpiece, the final tightening or clamping of the fastening device within the workpiece being accomplished by employing a conventional headed screw member, the shank of which is turned within a complementary aperture extending axially of the fastener shank. One embodiment of the present invention disclosed herein consists of a headed shank member in which the shank includes three discrete sections. The first section provides a wall of substantial thickness surrounding a bore for threadedly accommodating a screw member, a second shank section adjacent the head of the fastener of non-circular external shape which is adapted to be received within a complementary aperture in a workpiece, and a third tubular shank section of reduced diameter extending between the outer peripheral portions of the first and second shank sections is a plurality of resilient fingers which will twist and thereby establish a firm grip of the fastener periphery when the shank is rotated against the surface of a workpiece oppositely disposed from the shank head.

Disclosure of invention

The present invention is more particularly concerned with the provision of an improved and efficiently operable fastening device of the type referred to above, which lends itself structurally to be produced economically by practicing conventional plastic molding methods. To this end the invention contemplates a one piece fastening device composed of suitable plastic material which is inherently resilient, and yet sufficiently tough to permit the firm tightening of a screw within the fastener shank as the head of the fastener shank is sealingly clamped against the surface of a workpiece in the vicinity of a work aperture.

More particularly, the present invention contemplates structural improvements in the fastener shank which will contribute to the desired yieldability or resiliency of the shank and consequently the sealing effectiveness thereof during the final tightening rotation of an associated screw member within the shank.

It is a further and very important object of the present invention to provide a fastening device of the type heretofore referred to which, when finally tightened in position, will become completely sealed within the work aperture. To this end it is proposed to provide a fastener of suitable plastic material, the shank portion of which will be subjected to both rotative and axial forces during the final tightening of the fastener within a workpiece.

The foregoing and other objects and advantages will be more apparent from the following detailed description when considered in connection with the accompanying drawings, wherein:

FIG. 1 is a perspective view of a fastening device representing one embodiment of the present invention, said fastening device being shown in operative association with an apertured workpiece;

FIG. 2 is a vertical sectional view taken substantially along the line 2—2 of FIG. 1, the fastener per se being shown in elevation;

FIG. 3 is a horizontal sectional view taken substantially along the line 3—3 of FIG. 2;

FIG. 4 is a vertical sectional view taken substantially along the line 4—4 of FIG. 3;

FIG. 5 is a view similar to FIG. 2, showing the fastening device finally tightened in position within the workpiece, more clearly to illustrate the unique structural and functional characteristics of the fastener shank;

FIG. 6 is a vertical sectional view taken substantially along the line 6—6 of FIG. 5;

FIG. 7 is a view similar to FIG. 1, illustrating in perspective a modified embodiment of the fastener shank;

FIG. 8 is a side elevational view of the fasteneing device illustrated in FIG. 7, with the workpiece shown in section;

FIG. 9 is a view similar to FIG. 8, showing the fastening device finally tightened in position within the workpiece;

FIG. 10 is a sectional view taken substantially along the line 10—10 of FIG. 8; and FIG. 11 is a similar vertical sectional view, taken substantially along the line 11—11 of FIG. 9.

Referring now to the drawings more in detail, wherein like numerals have been employed to designate similar parts throughout the various figures, it will be seen that one embodiment of the present invention includes a fastening device designated generally by the numeral 12, FIGS. 1–6, inclusive. This fastening member 12 is preferably formed of suitable plastic material having the required degree of resiliency and toughness. The fastener 12 includes a shank portion 14, designated by the brackets in FIGS. 1, 2, 3 and 5. A fastener head 16 is formed integral with the shank 14 at one extremity thereof. The fastener shank is formed in three sections. The first section, designated by the numeral 18, forms the entering extremity of the shank and is tapered to facilitate initial insertion thereof within a complementary work aperture. The second section 20 of the shank 14 is positioned adjacent the fastener head 16. A third, or intermediate, shank section 22 is located between the shank sections 18 and 20.

In the disclosed embodiment, the shank section 20 is noncircular in transverse cross-section, namely square. In FIGS. 1, 2 and 3 the shank section 20 is positioned within a correspondingly shaped aperture 24 in a workpiece or inner refrigerator liner 26 prior to tightening the grommet type fastener in its final position within the work aperture. Upon initial insertion of the shank 14 within the work aperture, suitable lugs 28, circumferentially spaced along the periphery of the second shank section 20, yield radially inwardly and upon complete insertion spring back to their normal position in which they cooperate with the fastener head 16 on the opposite side of the workpiece to retain the fastener in place.

A central screw accommodating aperture 30 is provided in the first shank section 18 and it will be noted that the shank walls of section 18 are relatively thick, whereby to counteract any tendency for stripping threads in the shank during the final tightening action of a screw member 32, later to be described. The continuation of the aperture 30 toward the head extremity of the fastener shank is enlarged somewhat and the shank in this area is out of contact with the threads of the screw member 32. In instances where desired, a washer-like portion of a rack or shelf 34 may be interposed between the head of the screw 32 and the outer surface of the fastener head 16 as clearly shown in the various figures.

Particular attention is now directed to the structural arrangement of the third or intermediate shank section 22. This shank section 22 includes an annular wall section 36 of reduced diameter extending axially between the first shank section 18 and the second shank section 20. As previously indicated, the inner surface of the annular wall portion 36 is free from engagement with the shank of the screw member 32. Positioned radially outwardly of the reduced annular wall 36 is a pair of diametrically located arms or flexible elements 38. Each arm extends from diametrically opposed corners of the second shank section 20 both axially and circumferentially to a point where they are formed integral with diametrically disposed corners of the entering or first shank section 18. As the threaded shank of the screw member 32 continues to rotate within the entering section 18, from the position shown in FIGS. 1–3, inclusive, the shank section 18 is subjected to forces tending to shift it axially toward the head extremity of the fastener and to impart some rotation to the shank section. During this period of the tightening operation, the flexible elements or arms 38 are shifted from the position shown in FIGS. 1 and 2 to the position shown in FIG. 5. The torsional and axial forces acting upon the entire shank structure of the fastener cause the head 16 to be drawn tightly against one side of the workpiece 26. This provides an effective seal on one side of the aperture 24, as the shank section 18 is rotated from the position illustrated in FIG. 4 to the position shown in FIG. 6. These rotative and compressive forces acting upon the fastener shank cause the shank section 20 to be urged into sealing engagement with the material of the workpiece along the margin of the aperture 24 oppositely disposed from the head 16. The work aperture 24 is sufficiently large to permit the shank material to be doubled upon itself and drawn into the aperture without engaging the threads of the screw 32 (FIG. 5). Thus a very effective grommet type fastener seal is obtained.

In FIGS. 7–11, inclusive, a grommet type fastening device of modified form is disclosed. This fastening device is designated generally by the numeral 12a; the various structural features shown in FIGS. 7–11, inclusive, forming counterparts om similar structures in the previously described device are given corresponding numbers bearing the suffix a. The fastener device 12a is provided with a noncircular head 16a, as distinguished from the circular head 16 previously referred to. The only other significant structural feature differing from the device previously described is the arrangement of the diametrically opposed flexible arms or elements. The arms 38 of the fastener previously described had a portion extending in substantial parallelism with a plane normal to the fastener axis. The flexible elements 38a are in the nature of radial wings formed integral with and extending outwardly from the periphery of the reduced wall section 36a. Also, these wings 38a are positioned in planes inclined with respect to the longitudinal axis of the fastener.

The functioning of the flexible elements or wings 3a is similar to the functioning of the previously described arms 38. In both instances, these flexible elements are subjected to forces tending to stress them circumferentially and axially. The resulting effect is to cause sealing engagement of the fastener head against one side of the workpiece and a sealing engagement of the shank body on the opposite side of the workpiece along the margin of the work aperture. Also, in both embodiments, the entering sections of the fastener body or shank are subjected to rotative and compressive forces.

Fasteners of the type herein described have a very practical application in instances where apertures in sheet metal workpieces, for example, should be sealed against moisture. This is particularly true in refrigerators. The tendency for moisture to collect on the inner walls of a refrigerator require that apertures in such walls be sealed against leakage of such moisture. The particular type of fastener described herein has a very practical application as a shelf support in refrigerators. The shelf structure is designated by the numeral 34 in FIG. 2, and 34a in FIG. 8. Obviously the fastener device herein described is not limited to use in refrigerators, but has many other very practical applications in instances where an effective fastener seal is important. When used in a refrigerator structure as shown in the drawings, the shanks 14 and 14a extend into the insulation material indicated by the numerals 40 and 40a, in FIGS. 5 and 9 respectively.

From the foregoing it will be apparent that the present invention contemplates a novel and highly efficient grommet type fastener device. The form of the fastener body is such as to lend itself for manufacture by conventional plastic molding methods. Its relatively simple one-piece design assures the utmost ease in assembly. By imparting both rotative and compressive forces to the fastener shank as herein described, a very effective seal is assured and the fastener is retained firmly in position While for purposes of disclosure certain specific embodiments have been illustrated herein, it should be understood that the invention is by no means limited to these specific forms, but contemplates other modifications and changes coming within the spirit and scope of the appended claims.

The invention is claimed as follows:

1. A one piece plastic fastening device comprising a shank insertable within an aperture of a workpiece, and a fastener head at one end of said shank for overlying and clampingly engaging one side of a workpiece and having an aperture extending axially therethrough and into said shank, said shank including a first section at its entering end provided with an axial bore for threadedly receiving a screw member, said first shank section having a substantial wall thickness to counteract tendency for stripping thread convolutions therein when the fastener is finally clamped in position as an incident to rotation of an operatively associated screw member, said shank including a second section adjacent said head having a noncircular external cross-sectional shape, said shank including a third tubular shank section of reduced diameter interposed between the aforesaid first and second shank sections, and circumferentially spaced flexible members in the nature of fingers positioned radially outwardly of said third shank section and generally transversely between the outer peripheral portions of said first and second shank sections, the portion of the aperture within said head and second shank section having an internal diameter greater than the diameter of the screw accommodating aperture in the first shank section, and peripheral fastener retaining lugs on the second section spaced axially from the fastener head adapted to engage the surface of a workpiece oppositely disposed from the surface of the workpiece to be engaged by said fastener head, the disposition and cross-sectional shape of said flexible members being such that when the head of an associated screw member is rotatably clamped against the head of the fastening device, said members will yield torsionally.

2. A one piece plastic fastening device as set forth in claim 1 wherein the circumferentially spaced flexible members are in the nature of relativedly narrow fingers extending between the outer peripheral portion of the first and second shank sections.

3. A one piece plastic fastening device as set forth in claim 1, wherein the circumferentially spaced flexible members are in the nature of wings radiating from the third section of reduced diameter.

4. A one piece plastic fastening device as set forth in claim 1, wherein means is provided in association wth the head section in the nature of a shelf support.

5. A one piece plastic fastening device as set forth in claim 1 wherein a circumferential protuberance means is provided under the periphery of the head.

6. A one piece plastic fastening device as set forth in claim 1 wherein the circumferentially spaced flexible members and the shank section of reduced diameter are so shaped and disposed as to permit limited rotation of the first shank section during the final tightening of a screw member therein.

7. A one piece plastic fastening device as set forth in claim 1, wherein the second shank section is polygonal in cross-section.

8. A one piece plastic fastening device as set forth in claim 1 wherein a metallic screw member is associated therewith adapted to form thread convolutions in the first shank section and is free from initial contact with the second and third shank sections.

References Cited

UNITED STATES PATENTS

| | | | |
|---|---|---|---|
| 2,887,926 | 5/1959 | Edwards | 85—70 |
| 3,014,563 | 12/1961 | Bratton | 85—70 |
| 3,105,407 | 10/1963 | Rapata | 85—72 |
| 3,143,916 | 8/1964 | Rice | 85—71 |
| 3,313,083 | 4/1967 | Flora | 85—70 |

FOREIGN PATENTS

| | | |
|---|---|---|
| 1,315,418 | 12/1963 | France. |
| 1,406,174 | 6/1965 | France. |

EDWARD C. ALLEN, *Primary Examiner.*